Dec. 17, 1963
P. S. MUNN
3,114,793
CABLE SPLICE
Filed Oct. 25, 1961
2 Sheets-Sheet 2
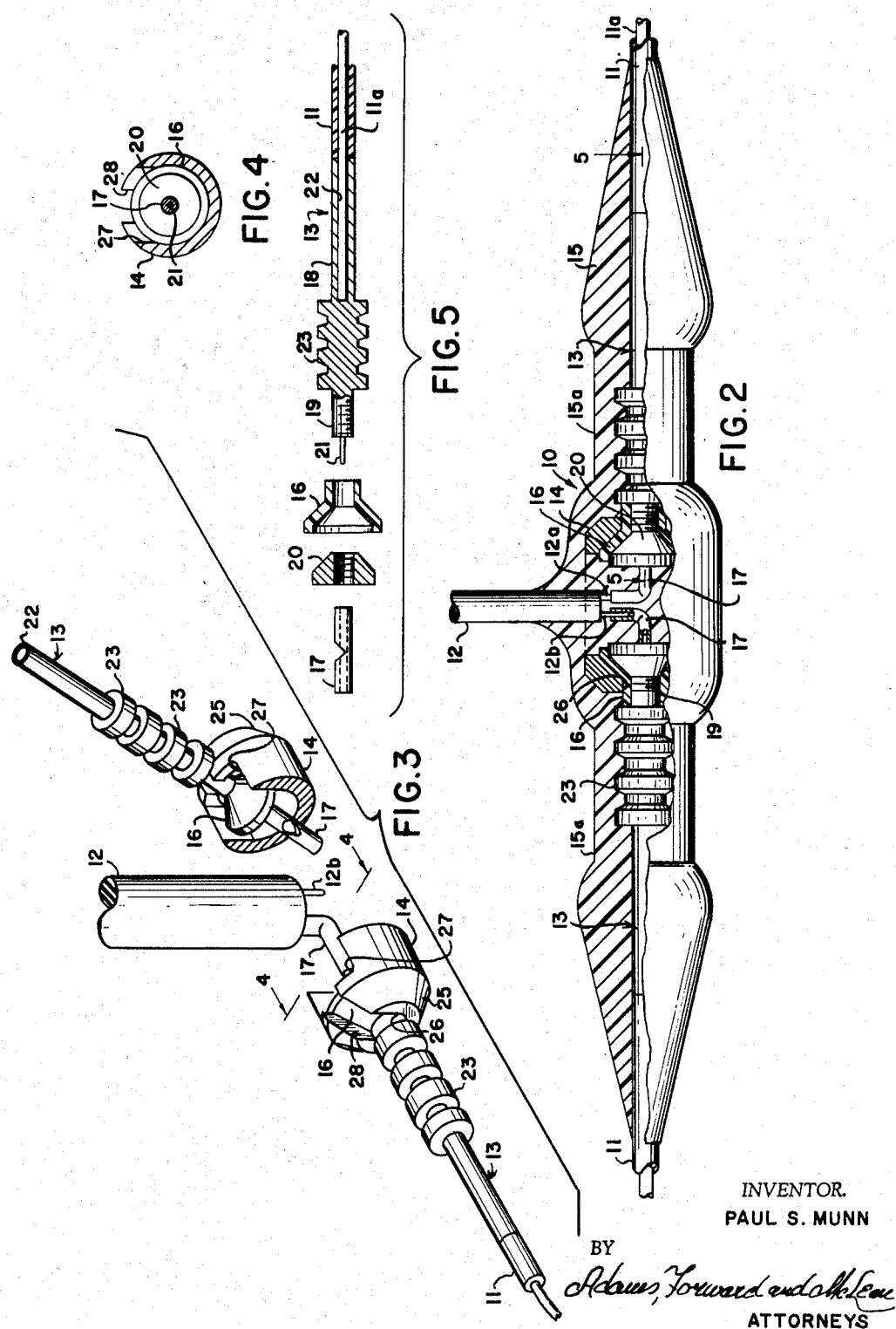
INVENTOR.
PAUL S. MUNN
BY Adams, Forward and McLean
ATTORNEYS

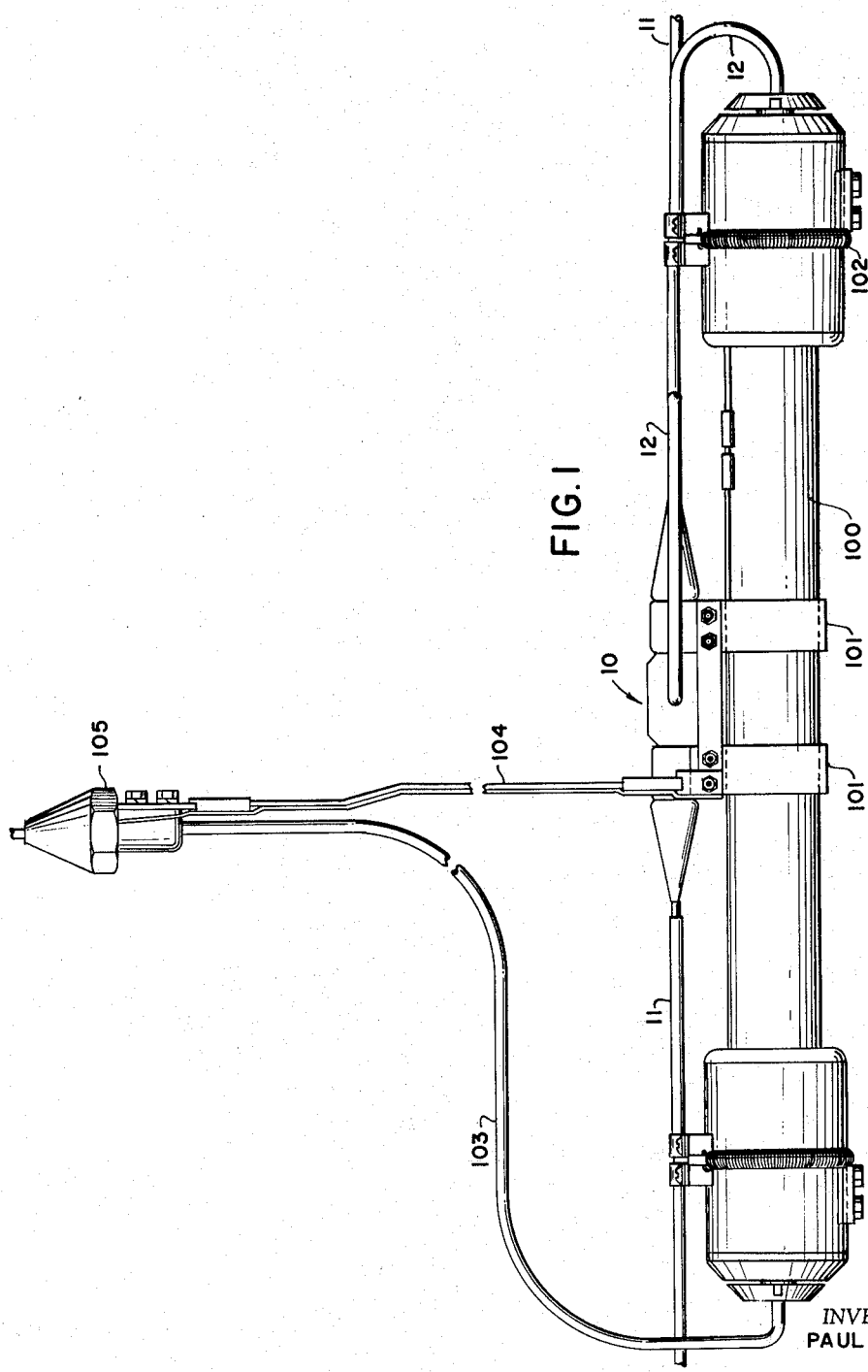

3,114,793
CABLE SPLICE
Paul S. Munn, Melrose, Mass., assignor to Simplex Wire and Cable Company, Cambridge, Mass., a corporation of Massachusetts
Filed Oct. 25, 1961, Ser. No. 147,603
3 Claims. (Cl. 174—71)

My invention relates to electric cables and in particular provides a device for splicing two sections of an armorless cable together in which, while straight-through tensile strength is maintained, the spliced ends of the cable sections can be electrically isolated where it is desired to connect other equipment electrically in series between the spliced cable sections.

In deep-sea, armorless cable it is usually necessary to obtain the requisite cable modulus by utilizing high tensile strength materials as conductors. Thus, for example, one type of deep-sea, armorless cable involves the employment of a composite conductor which includes a solid steel core to obtain the necessary high tensile strength and which includes a copper sheath about the core to obtain the necessary high conductivity. When electrical equipment, such as a repeater, is to be included in such an armorless cable at some point along its length, the cable must be spliced in a manner mechanically securing the spliced ends of the conductor without loss of tensile strength at the splice while permitting interruption in its electrical continuity such that the repeater can be electrically inserted in series at the location of the splice.

It is to this end that my invention is primarily directed, and in accordance with such purpose I provide a cable splice including basically a pair of cable anchors, each for mechanically gripping the end of the conductor of a different one of the two sections of cable to be spliced and a retainer mechanically holding the cable anchors in fixed position with respect to each other but electrically isolated from each other. It will be apparent in such a construction, in order to provide the necessary tensile strength, that the cable anchors and retainer must be constructed of metallic materials, preferably steel, and that the joint between each cable anchor and the retainer must be locked. It is, however, desirable to avoid the use of fastening devices which must be added subsequently to assembly of anchors and retainers in order to permit the retainer to be made as small as possible.

It is thus an important object of my invention to provide such a construction in which the cable anchors are self-locked in the retainer without the requirement of fastening devices. At the same time the lock, in accordance with our invention, must of necessity permit the inclusion of suitable insulating bushings in order that one cable anchor can be electrically isolated from the other.

To this end in my construction each cable anchor near its end remote from its mechanical connection with the cable conductor includes a portion of larger transverse dimension than that portion of the anchor next adjacent in the direction of the cable. Thus, for example, each cable anchor can be flanged, be provided with a groove or have a nut at its end in order that it can be locked in an aperture in the retainer.

The crux of this construction lies in the retainer which is so formed as to permit two such cable anchors to be locked in a pair of oppositely disposed apertures without the necessity of having to install nuts or other fastening devices within the retainer after the cable anchors are positioned. Thus the splice of my invention is particularly adaptable to highly miniaturized construction. To this end the apertures for receiving the cable anchors, as suggested above, are oppositely disposed and a lateral opening in the retainer is provided between the apertures. At each end of the lateral opening adjacent a cable anchor receiving aperture, a slot is provided in the retainer extending between the lateral opening in the retainer and such adjacent aperture, such that the aperture actually forms the bottom of the slot.

Interiorly, adjacent each aperture, the retainer is shaped to receive the enlarged end portion of the cable anchor with an insulating bushing over it. Each slot and associated aperture are laterally dimensioned slidingly to receive the narrower portion of the cable anchor with the bushing overlying such portion also. The transverse dimension of the lateral opening adjacent each slot is sized to permit free passage of the enlarged portion of the cable anchor with the bushing positioned over it.

Each cable anchor with its insulating bushing in place is electrically connected to at least a part of the equipment to be associated with the cable prior to positioning the anchors in the retainer. Such connection can simply be to a length of insulated cable and is made at the end of the anchor to be locked in the retainer. The cable anchors are then positioned with the enlarged portions confronting each other and are inserted through the lateral opening with the narrower portions in opposite slots until each cable anchor bottoms in the aperture at the end of the slot in which it is positioned. The cable sections to be joined, if not previously so received, are then secured in the cable anchors by mechanically fastening the end of each high tensile strength conductor to an anchor. The whole assembly is then inserted in a mold to apply a solid dielectric over the retainer and cable anchors and onto a length of the insulation of the cables as well as onto the intended connection to associated equipment. Thus the molding operation completes the splice by providing a solid dielectric body completely enclosing the entire splice.

For a more complete understanding of the practical application of my invention, reference is made to the appended drawings in which:

FIGURE 1 is an elevation of a cable splice in accordance with my invention showing an armorless cable in conjunction with a repeater associated with the cable;

FIGURE 2 is a plan view partly in section of the splice shown in FIGURE 1;

FIGURE 3 is a fragmentary isometric view of a portion of the splice shown in FIGURE 2 in which one part has been divided and separated to illustrate more clearly the manner of assembling the basic units of the splice;

FIGURE 4 is a cross-section taken at line 4—4 in FIGURE 3; and

FIGURE 5 is a fragmentary section taken at line 5—5 in FIGURE 2.

Referring more particularly to FIGURE 1 the reference numeral 10 designates generally a splice in a deep-sea, armorless cable 11 which has been constructed in accordance with our invention to permit lateral connection to be made from cable 11 in splice 10 to a repeater 100 by means of a two conductor cable 12. Repeater 100 is supported beneath cable 11 and joint 10 by brackets and clamps generally indicated by the reference numeral 101 which are received about splice 10. As repeater 100 is considerably longer than splice 10, additional clamping arrangements indicated by the reference numeral 102 are provided near the ends of repeater 100 and are secured to cable 11 above them in order to guide repeater 100 generally aligned beneath cable 11. In the particular construction employed repeater 100 for purposes not germaine to my present invention is also provided with a connection with a buoyant device mounted above it. The connection, which is indicated by the reference numeral 103, is a cable similar to lateral connection 12 and enters repeater 100 at its end opposite that through which connection 12 enters repeater 100. The riser connection is illustrated since splice 10 is utilized also to provide an anchor for the buoyant riser by a strap 104 which is secured to one of the brackets 101 at its lower end and secured at its upper end with a fitting 105 leading to the buoyant device with which repeater 100 is electrically connected by cable 103.

Referring more particularly to FIGURE 2, splice 10 of my invention includes a pair of cable anchors 13, 13, a retainer 14 and a solid dielectric body 15 as well as a pair of bushings 16, 16 and a pair of connector sleeves 17, 17.

Referring also to FIGURES 3 and 5 each cable anchor 13 is a rod 18 of steel or similar material having generally cylindrical appearance and which is at one end provided with threads 19 and a frusto-conical nut 20 which is received on threads 19 with its conical surface directed toward the unthreaded end of anchor 13. At its threaded end rod 18 is also provided with a coaxial pin 21 projecting a short distance from such end. At its end remote from its threaded portion 19, rod 18 is provided with an axial bore 22 extending partly through the length of rod 18. Intermediate its ends rod 18 is provided with a series of four annular flanges 23 spaced from each other with their confronting faces tapering slightly toward each other such that in section the notch between each pair of adjacent flanges 23, 23 has the shape of a flat-bottomed V. As can be seen in FIGURE 2, the four flanges 23 on rod 18 of each cable anchor 13 form a castellated gland to aid in providing a moisture tight seal between the anchor and dielectric body 15 which encloses it.

Bushings 16, as will be noted referring particularly to FIGURE 2, are positioned over the threaded ends of rods 18, one bushing 16 being positioned between nut 20 and flanges 23 of each anchor 13. Specifically each bushing 16 is constructed of relatively hard, resinous, dielectric material, such as nylon, and is in the form of a short cylindrical section which flares to conical shape at one end, the dimensions being such that the flared end is snugly received on the conical surface of nut 20 while the cylindrical section is received snugly on rod 18 immediately next to nut 20.

Referring more particularly to FIGURES 2, 3 and 4, retainer 14 (which is shown divided transversely and separated longitudinally in FIGURE 3) is in the form of a hollow cylinder having frusto-conical ends 25 the smaller bases of which are the extreme ends of retainer 14 and are centrally apertured, as indicated by the reference numeral 26. The inside diameter of each aperture 26 equals the outside diameter of the cylindrical portion of bushing 16.

Between its ends retainer 14 in its cylindrical portion is provided with a generally rectangular lateral opening 27 having a transverse (circumferential) dimension just larger than the transverse dimension (diametrical) of the base of the frusto-conical portion of bushing 16 which is slightly greater than the corresponding dimension of nut 20 which it overlies. Interiorly each frusto-conical end 25 of retainer 14 is shaped to conform with the frusto-conical portion of the exterior of a bushing 16, and at each end 25 a slot 28 through end 25 extends between aperture 26 and opening 27. The transverse dimension of slot 28 is equal to the diameter of aperture 26, and the two slots 28 at their ends remote from their associated apertures 26 open centrally into opposite ends of opening 27.

In assembling splice 10 bushings 16 are slipped over the threaded ends of cable anchors 13 up to a position adjacent flanges 23 with the conically flared ends of bushings 16 facing away from flanges 23. Nuts 20 are then tightened down on threads 19 with the enlarged base of each nut 20 more closely adjacent threaded end 19 such that the conical surface of each nut 20 confronts the interior of the conically flared end of the bushing 16 associated with the cable anchor 13 of which such nut 20 is a part.

Thereafter a short tubular sleeve 17 is slipped over each pin 21. Preferably sleeves 17 are notched at their centers to facilitate bending and are brazed on pins 21 such that the notched portion is just beyond the tip of pin 21. Each sleeve 17 is then bent to approximately a 90° angle, allowing the notches to facilitate such bending, and the end of one conductor 12a of two conductor, insulated cable 12 is inserted in the open end of one sleeve 17 and the adjacent end of the other conductor 12b is inserted in the open end of the other sleeve 17, both conductors 12a and 12b then being brazed, or preferably crimped, in their associated sleeves 17 to secure them.

Referring more particularly to FIGURE 3 each cable anchor 13 is then positioned over lateral opening 27 with the cylindrical portion of its associated bushing 16 adjacent the opening of slot 28 into lateral opening 27 and with the base of nuts 20 approximately confronting each other. With the secured ends of conductors 12a and 12b of cable 12 positioned between them, the enlarged ends of cable anchors 13 formed by nuts 20 and bushings 16 are then dropped through lateral opening 27 with the cylindrical and relatively more narrow portion of each bushing 16 falling into a slot 28 and eventually bottoming in the associated aperture 26. In this position the conical surfaces of bushings 16 are snugly received in the conforming structure of the interior of ends 25 of retainer 14 and cable anchors 13 are axially aligned with conductor cable 12 extending out approximately perpendicular to such axial alignment through lateral opening 27.

The ends of the cable sections 11 to be joined are then affixed to anchors 13 by first removing some insulation to expose the conductors 11a at the ends of the sections of cable 11 to be spliced together. The ends of conductors 11a are then inserted into axial bores 22 of cable anchors 13 in which they are brazed. Alternatively rods 18 can be crimped about bores 22 to assure that the conductor and anchor are affixed together.

The entire assembly is then positioned in a mold which is constructed to permit cable sections 11 to extend out of opposite sides and cable 12 to extend out on a perpendicular to cable sections 11 and which is provided with a cavity having suitable shape to enclose not only the assembly of retainer 14 and cable anchors 13 but short lengths of the ends of cable 11 and a short length of cable 12 which are sufficient in length to include the dielectric jackets of cables 11 and 12. Dielectric material is then molded about the assembly to enclose it and fill all interior voids. Typically armorless cable 11 has polyethylene insulation as does also cable 12. Most conventional the dielectric body molded about the splice is also polyethylene such that where it overlies the insulation of the ends of the spliced sections of cable 11 and of cable 12 some degree of fusion with such insulation on the cables is obtained. Preferably the shape of the molded body 15 smoothly tapers outwardly from cables 11 to a higher diameter necessary to protect cable anchors 13 and enclose retainer 14. Preferably at two points, one on each side of lateral cable 12, body 15 is necked down slightly to form cylindrical portions 15a about which clamps 101 are received.

I claim:

1. A splice for an armorless submarine cable which splice includes (a) a pair of rigid cable anchors, (b) means on one end of each cable anchor for mechanically securing an end of a conductor of an armorless cable, (c) each said cable anchor adjacent the other end thereof having a first portion of larger transverse dimension than a second portion of said cable anchor adjacent thereto disposed toward said means,
(d) a rigid, hollow retainer,
(e) means defining a pair of oppositely disposed apertures in said retainer,
(f) means defining an enlarged opening into said retainer disposed between said apertures,
(g) means defining a pair of slots in said retainer each said slot communicating said opening with a different one of said apertures,
(h) a pair of bushings of solid dielectric material having a contour conforming to the external contour of said anchors about said first and second portions thereof,
(i) said cable anchors being disposed with said second portions of said cable anchors disposed each in a different one of said opposite apertures in said retainer with said first portions within said retainer and with said bushings mounted over said first and second portions and snugly fitting within said apertures and the interior of said retainer adjacent each said aperture, and
(j) a body of solid dielectric material extended over said retainer and cable anchors.

2. A splice for an armorless submarine cable which splice includes
(a) a pair of rigid cable anchors,
(b) means on one end of each cable anchor for mechanically securing an end of a conductor of an armorless cable,
(c) means on each said anchor permitting electrical connection at the other end thereof with a said conductor secured in said one end thereof,
(d) each said cable anchor adjacent the said other end thereof having a first portion of larger transverse dimension than a second portion of said cable anchor adjacent thereto disposed toward said first named means,
(e) each said cable anchor having a castellated portion intermediate said one end thereof and said second portion thereof,
(f) a rigid, hollow retainer,
(g) means defining a pair of oppositely disposed apertures in said retainer,
(h) means defining an enlarged opening into said retainer disposed between said apertures,
(i) means defining a pair of slots in said retainer each said slot communicating said opening with a different one of said apertures,
(j) a pair of bushings of solid dielectric material having a contour conforming to the external contour of said anchors about said first and said second portions thereof,
(k) said cable anchors being disposed with said second portions of said cable anchors each in a different one of said opposite apertures in said retainer, with said first portions within said retainer and with said bushings mounted over said first and second portions and snugly fitting within said apertures and the interior of said retainer adjacent each said aperture,
(l) said slots communicating said apertures and said opening being sized to receive the portion of said bushing overlying the second portion of each said cable anchor in sliding fit and said opening adjacent said slot being sized to receive said bushing overlying said first portion of said cable anchor,
(m) an insulated conductor pair having an end of each conductor connected to a different one of said electrical connecting means and extended laterally outward from said retainer, and
(n) a body of solid dielectric material extended over said retainer and cable anchors and onto the insulation of insulated conductor pair.

3. In a splice for an armorless submarine cable which splice includes
(a) a pair of rigid cable anchors,
(b) each said cable anchor having means thereon permitting an electrical conection with a conductor mechanically secured in one end thereof,
(c) each said cable anchor adjacent the other end thereof having a first portion of larger transverse dimension than a second portion of said cable anchor adjacent thereto more remotely located from said other end of said cable anchor, and
(d) a rigid, hollow retainer, the improvement which includes
(e) means defining a pair of oppositely disposed apertures in said retainer,
(f) means defining an enlarged opening into said retainer disposed between said apertures,
(g) means defining a pair of slots in said retainer each said slot communicating said opening with a different one of said apertures,
(h) a pair of bushings of solid dielectric material having a contour conforming to the external contour of said anchors about said first and second portions thereof,
(i) said cable anchors being disposed with said second portions of said cable anchors each in a different one of said opposite apertures in said retainer, with said first portions within said retainer and with said bushings mounted over said first and second portions and snugly fitting within said apertures and the interior of said retainer adjacent each said aperture, and
(j) said slots communicating with said apertures and said opening being sized to receive the portion of said bushing overlying the second portion of each said cable anchor in sliding fit and said opening adjacent said slot being sized to receive said bushing overlying said first portion of said cable anchor.

References Cited in the file of this patent

UNITED STATES PATENTS

| | | |
|---|---|---|
| 1,769,245 | Tregoning | July 1, 1930 |
| 2,140,154 | Greenidge | Dec. 13, 1938 |
| 2,857,454 | Bahr | Oct. 21, 1958 |
| 2,877,288 | Bollmeier | Mar. 10, 1959 |

FOREIGN PATENTS

| | | |
|---|---|---|
| 755,006 | Germany | Apr. 16, 1953 |